Feb. 13, 1945.  G. C. BECKER  2,369,425
WORK HOLDER AND INDEXING MEANS
Filed April 5, 1943  5 Sheets-Sheet 2
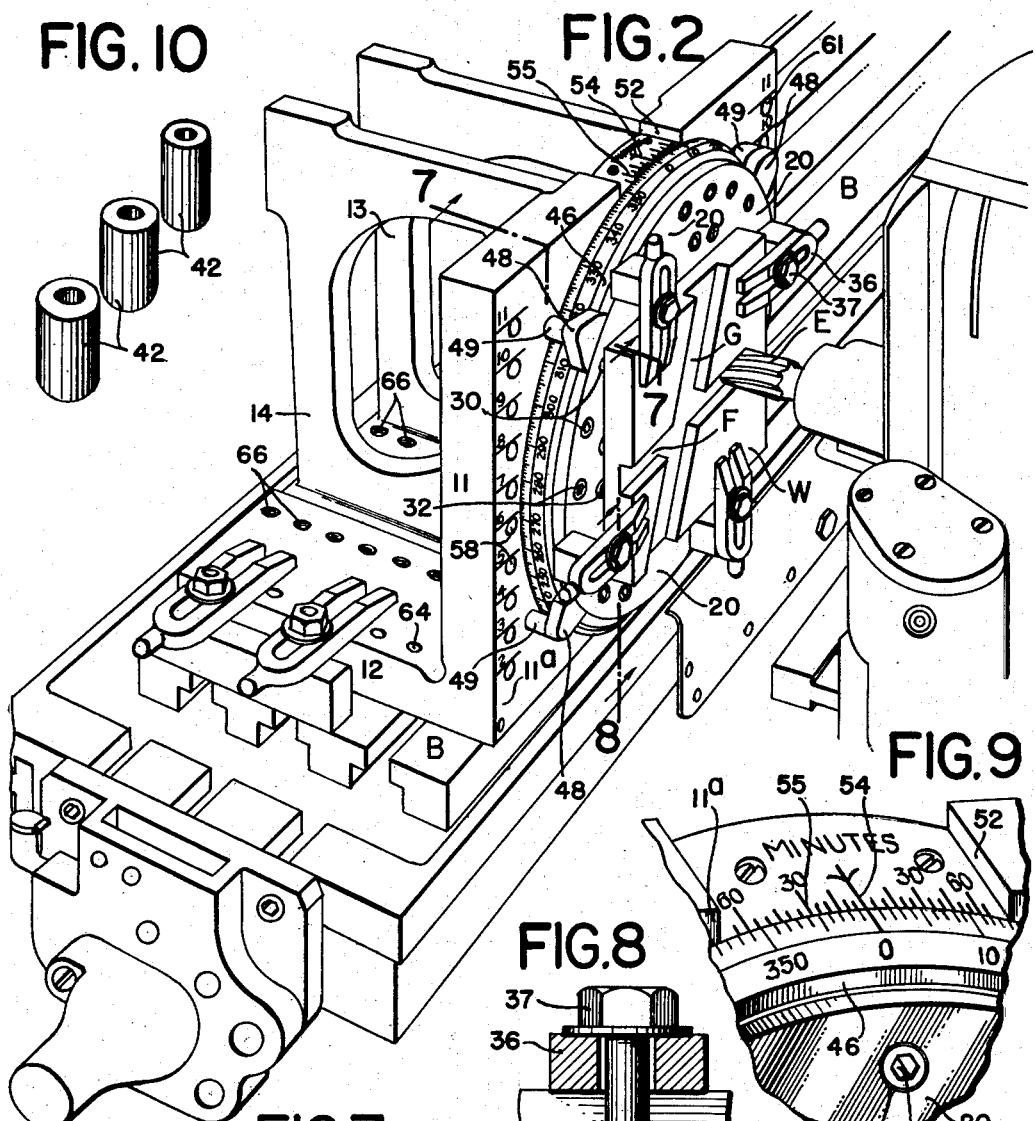
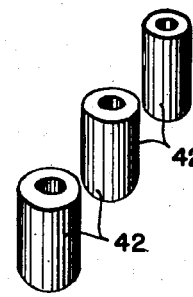
INVENTOR:-
GILBERT C. BECKER
BY Arthur R. Wylie
ATTY.

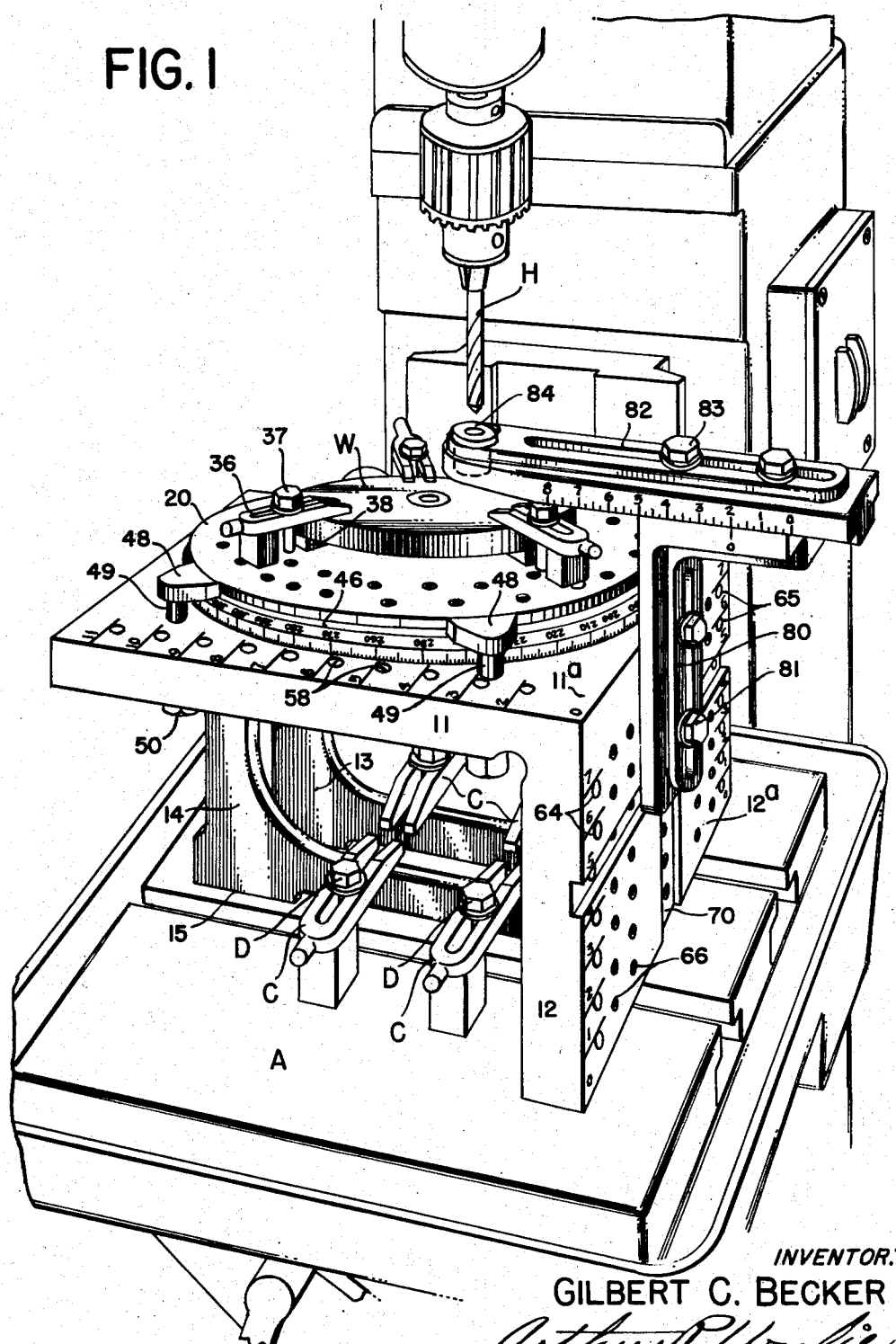

Feb. 13, 1945. G. C. BECKER 2,369,425
WORK HOLDER AND INDEXING MEANS
Filed April 5, 1943 5 Sheets-Sheet 3
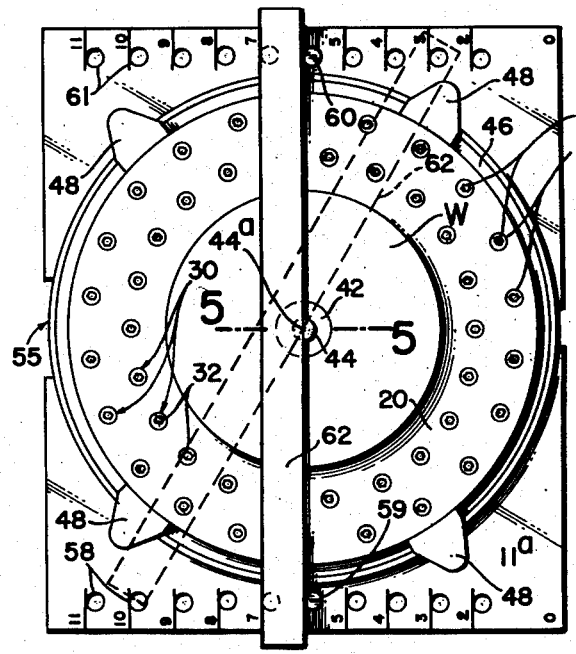
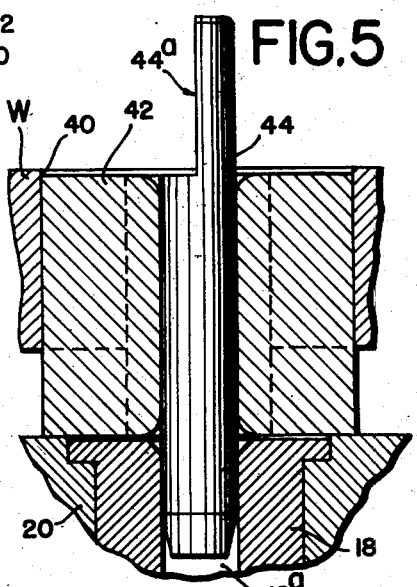
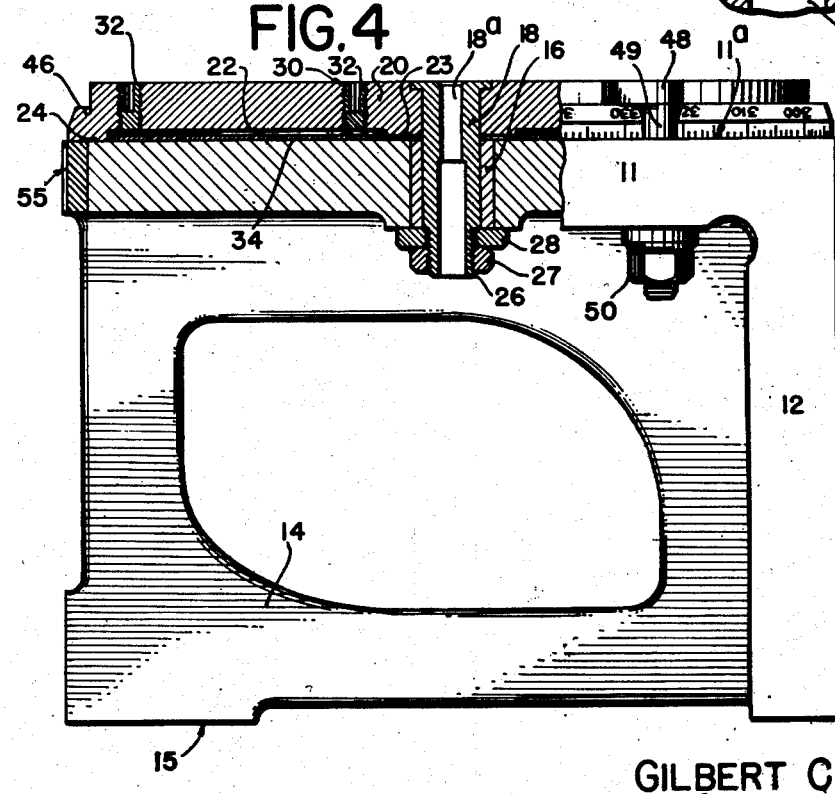
INVENTOR:-
GILBERT C. BECKER
BY Arthur R. Wylie
ATTY.

Feb. 13, 1945. G. C. BECKER 2,369,425
WORK HOLDER AND INDEXING MEANS
Filed April 5, 1943 5 Sheets-Sheet 4
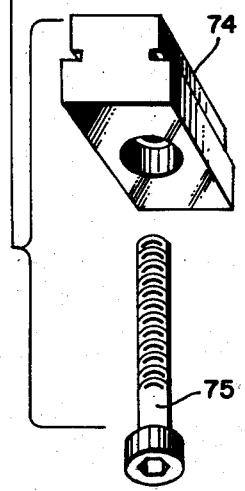
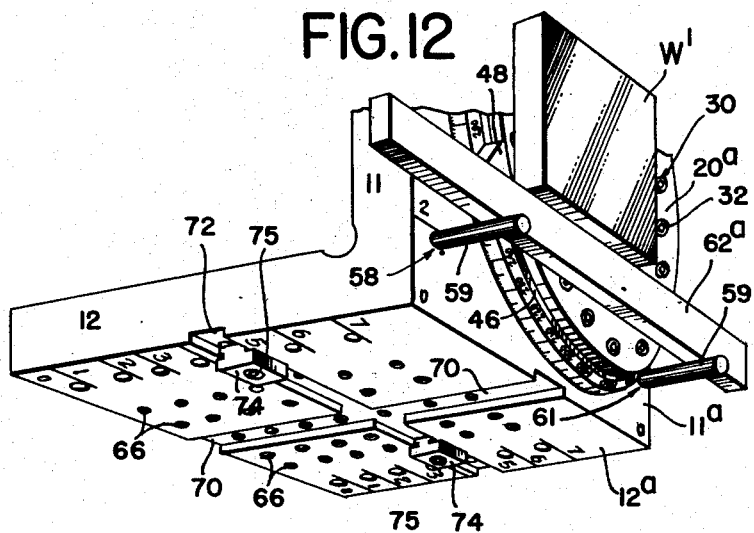
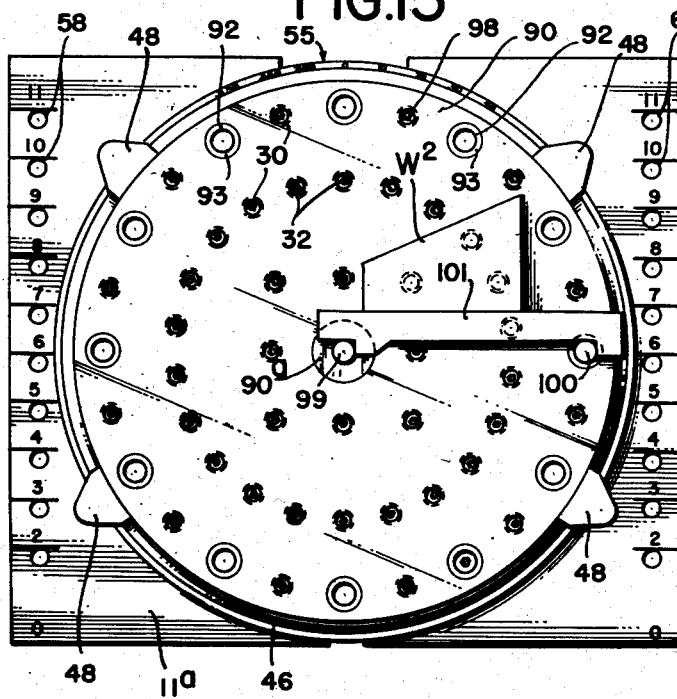
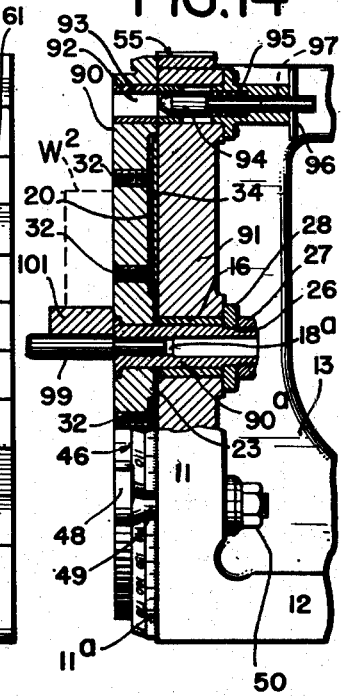
INVENTOR:-
GILBERT C. BECKER
BY Arthur R. Wylie
ATTY.

Feb. 13, 1945. G. C. BECKER 2,369,425
WORK HOLDER AND INDEXING MEANS
Filed April 5, 1943 5 Sheets-Sheet 5
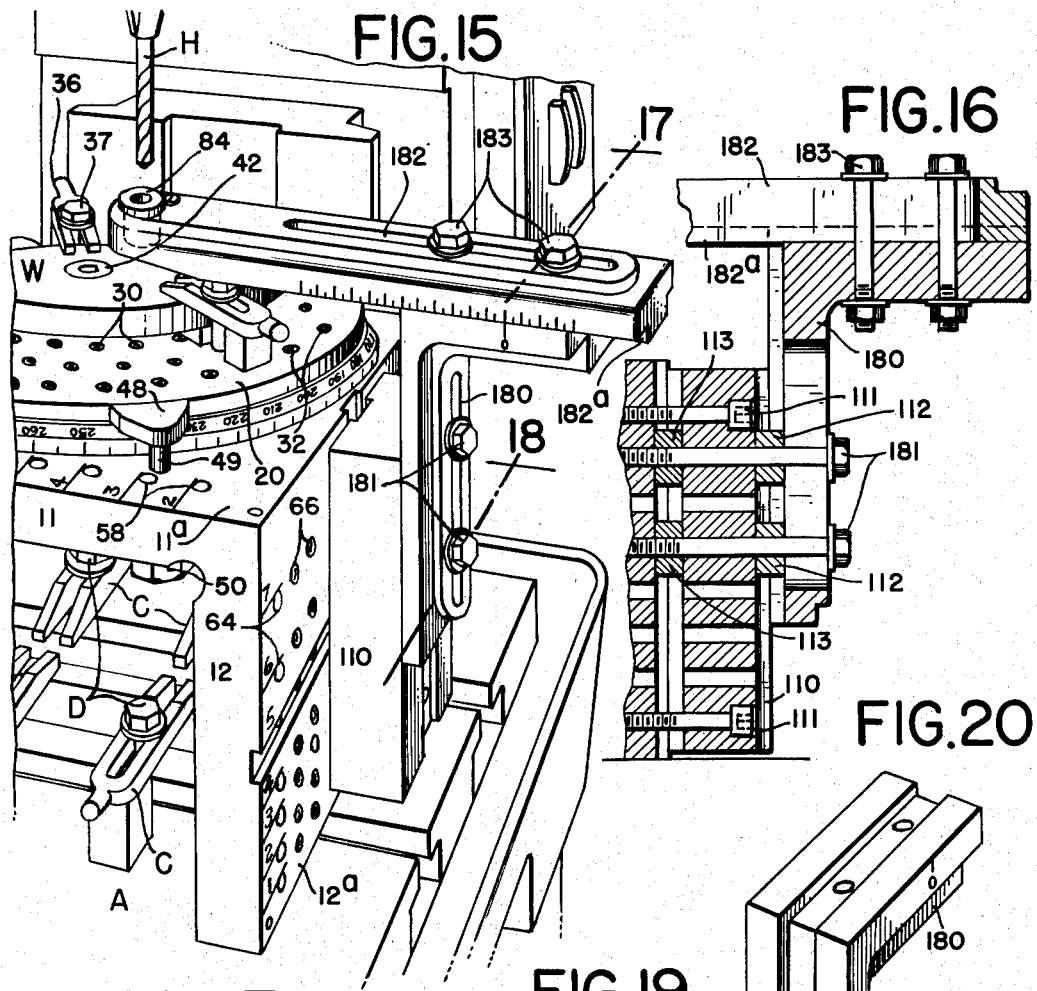
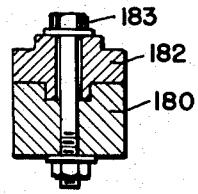
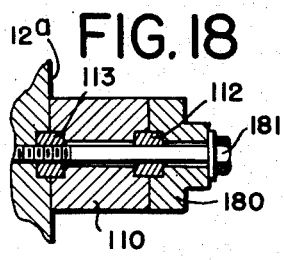
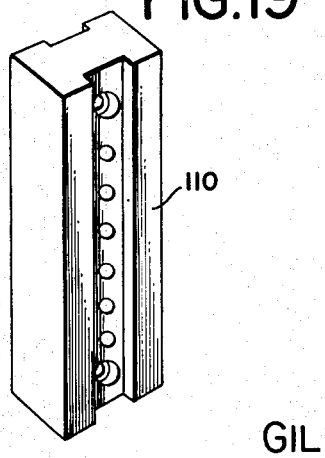
INVENTOR:—
GILBERT C. BECKER
BY Arthur R. Wylie
ATTY.

Patented Feb. 13, 1945

2,369,425

UNITED STATES PATENT OFFICE 2,369,425

WORK HOLDER AND INDEXING MEANS

Gilbert C. Becker, Robbinsdale, Minn., assignor to General Mills, Inc., a corporation of Delaware Application April 5, 1943, Serial No. 481,941

10 Claims. (Cl. 90—59)

This invention relates to devices adapted to be clamped to the carriage of a milling machine or shaper or to the table of a drill press or other machine tool for holding a part to be machined.

An object of this invention is to provide a simple and efficient means for holding work to be operated on by machine tools, such as a drill press or milling machines, said means including an indexing disk for holding the work parallel to the table or at a definite angle thereto and for rotating the work about a given axis so that a series of operations may be performed thereon at given angular positions of the work with respect to said axis.

This and other objects as will hereinafter appear are accomplished by this invention which are fully described in the following specification and shown in the accompanying drawings in which Figure 1 is a perspective view of the device in use on a drill press;

Fig. 2 is a perspective view of the same as used in a different way on a milling machine;

Fig. 3 is a top plan view of the device showing a straight edge used thereon for scribing and the like setting up work in a horizontal position parallel to the zero line;

Fig. 4 is an end elevation of the work holder shown partly in vertical section;

Fig. 5 is a partial enlarged vertical section on the line 5—5 of Fig. 3;

Fig. 6 is a side elevation of a dowel pin;

Fig. 7 is a partial enlarged section on the broken line 7—7 of Fig. 2;

Fig. 8 is a section on the line 8—8 of Fig. 2;

Fig. 9 is a partial perspective view of the top of the disk as shown in Fig. 2;

Fig. 10 is a perspective view of a number of bushings of various sizes to be used in connection with the central dowel pin as shown in Fig. 5;

Fig. 11 is a perspective of an aligning lug and its screw;

Fig. 12 is a partial perspective of the work holder viewed from the bottom when laid over on its side and showing a parallel bar in use above the disk;

Fig. 13 is a front elevation of a disk showing a sinebar in use thereon;

Fig. 14 is a partial side elevation of the same partly in section;

Fig. 15 is similar to Fig. 1 but showing a modified form of the invention;

Fig. 16 is a partial vertical section through the bracket and spacer block;

Figs. 17 and 18 are partial sections on the lines 17 and 18 of Fig. 15; and

Figs. 19 and 20 are perspectives of the bracket and supporting block.

The work holder as illustrated in Fig. 1 comprises essentially a frame having a top 11, a side 12 and spaced legs 13, 14. The outer faces of the top and sides are accurately machined at right angles to each other as are also the ends as well as the base consisting of the lower edge of the side 12 and of the feet 15 of the legs 13, 14 so that when the device is placed on the base, as shown in Fig. 1, it will rest squarely and accurately on the finished surface of a table A of a drill press as here shown or table B of a milling machine as shown in Fig. 2. In this way the finished surface 11$^a$ of the top 11 remains accurately parallel to the table A while the finished surface 12$^a$ is normal thereto. The legs 13, 14 are secured to the table by means of clamps C and bolts D in any manner known to machinists.

The top 11 is drilled centrally and has a bushing 16 pressed therein, the latter being adapted to receive a hollow shaft 18 which in turn is pressed into the central opening in a disk 20. This disk is provided on its inner surface with an annular recess 22 leaving a central hub 23 and annular shoulder 24, the hub being in a plane .010" above the shoulder 24 so that the shoulder alone bears evenly on the top 11$^a$.

The shaft 18 is shouldered and provided with a reduced screw thread 26 to receive a nut 27 with a washer 28 bearing against the shoulder and spaced slightly from the inner end of the bushing 16 so as to provide a working clearance. Thus the disk 20 is freely rotatable on the top of the work holder but is prevented from being disengaged therefrom by means of the nut 27.

The top of the disk 20 is provided with a series of spaced tapped holes 30 into which capscrews may be screwed for retaining work thereon as will later be described. When not in use these holes are normally provided with Allen-head setscrews 32 for preventing chips and dust from passing through the disk. An annular plate 34 of metal or the like is placed in the annular recess 22 at the bottom of the disk to prevent injury to the top 11$^a$.

A work piece W to be operated on is secured to the disk 20 by means of clamps 36 and capscrews 37 while the work itself may rest on suitable blocks 38. The work piece may also have a central opening 40 (Figs. 1 and 3) into which may be snugly fitted a suitable bushing 42 which is bored to receive a centering pin 44, the lower end of which is snugly fitted into a hole 18ᵃ in the shaft 18. Thus the work piece W is accurately centered with respect to the disk 20 and when clamped thereon, as shown in Fig. 1, the two will be rotated together.

The disk 20, as shown in Figs. 1, 4 and 7, is provided with an annular outer ledge 46 on which is adapted to bear a clamp 48 which has a shank 49 passing through the top of the work holder, the latter being threaded to receive a nut 50 by means of which it may be drawn down so as to clamp the disk to the top of the work holder. The periphery of the disk is graduated in degrees, the edge of the top being recessed at 52, as shown in Figs. 2 and 9, to provide means for inscribing an indicator 54 which is accurately located in line with the center of the disk. A vernier 55 may be used as shown in Fig. 9, if desired, for a more accurate setting of the disk.

Thus it will be seen that with the disk 20 set in one position as shown in Fig. 2 and clamped to the top of the work holder, as previously described, and the work holder in turn clamped to the table of a machine tool, such as the milling machine here shown, the table can slowly be advanced while an end mill E makes a cut F. Without removing the work piece from the work holder the disk may be loosened and rotated to another position such, for example, as for making a finishing cut in a slot G, the angular position of the disk being properly located by means of the peripheral graduation with respect to the indicator 54.

A line of holes 58 is provided along one side of the top 11ᵃ, each of which is adapted to receive a dowel pin 59. A similar dowel pin 60 shown on the far side of the work holder is adapted to be received in any one of a similarly spaced line of holes 61. These holes are equally spaced and accurately drilled in lines parallel to the face 12 so that a straight edge or parallel bar 62 may be placed against two dowel pins placed in corresponding holes for accurately positioning the work holder with respect to the table of the machine. The work, and in some cases the top of the disk, may be coated with chalk or layout fluid so that lines may be scribed thereon for laying out work. The centering pin 44 is cut away at 44ᵃ to its center to receive the bar 62 for scribing radial lines on the work by rotating it and permitting the bar to lie in the position shown in Fig. 3. The spacing of the holes 58 and the width of the bar 62 are preferably made one inch for simplicity.

Also a line of plain drilled holes 64 is placed along one side of the work holder shown in Fig. 1 and a similar line of holes 65 is formed along the other side, both of which are equally spaced and parallel to each other and to the corresponding edges of the work holder. Intermediate lines of holes 66 are tapped to receive capscrews for holding lugs, brackets, work pieces and the like on the surface 12ᵃ.

These outer lines of holes 58, 61, 64 and 65 are located definite distances from the common edge indicated as zero. These holes are adapted to receive dowel pins and parallel bars like 62 which may be placed thereon for accurately lining up the work with respect to the table.

Vertical and horizontal grooves 70, 72 are accurately formed in the face 12ᵃ parallel to and at right angles to the surface 11ᵃ. Lugs 74 are secured therein by screws 75 and these lugs closely fit grooves in the table or carriage for accurately positioning the work holder thereon.

These grooves or the lugs 74 may also serve to position a bracket 80 (Fig. 1) by suitable capscrews 81 to the face 12ᵃ. An arm 82 is slidably mounted on the bracket and secured in adjusted position by means of capscrews 83 so that the center of the arm is always in alignment with the center of the disk when the bracket is pulled tightly against a given side of the lugs in the groove 70. A graduated scale is preferably placed on the side of the arm to assist in positioning the arm which carries a drill bushing 84.

The drill H may be used to drill a desired hole in the work piece W and then if a similar hole is to be drilled at a point equally distant from the center, the work piece together with the disk 20 to which it is clamped may be rotated through the desired angle as indicated by the peripheral graduations after which the disk is again clamped to the top of the work holder and the drill H is again lowered.

In Fig. 12 the work piece W' is shown being located or laid out on the disk 20ᵃ by means of a parallel bar 62ᵃ.

In Figs. 13 and 14 a disk 90 rotatably mounted on a central sleeve 90ᵃ on a table 91 has a series of openings 92 in which are pressed bushings 93. A pin 94 is slidably mounted in the table 91 and adapted to enter any of the openings 92 for positioning the disk. The pin 94 is pressed by a spring 95 and has a reduced extension through which passes a bar 96 adapted when the pin 94 is turned to enter a slot 97 to permit the spring 95 to urge the pin 94 into one of the openings 92. The holes 92 are accurately spaced for jig drilling.

Between the openings 92 are located a series of tapped holes 98 in the disk whereby a work piece may be bolted thereto. Sleeve 90ᵃ has a pin 99 located centrally therein. A pin 100 may then be set in any of the openings 92. Since these pins are all accurately of the same diameter, a bar 101 may be laid across them to position work W² on the disk and it may then be clamped in adjusted position as shown in Figs. 1 and 2 for any desired machining operation or layout.

In Figs. 15 to 20 is shown a modified form of the device in which a spacer block 110 of accurate uniform thickness is placed between the work holder and bracket 180 and is held in place by screws 181. The bracket is held in place by capscrews 181 which pass through the bracket, and positioning lugs 112 and 113 and screw into tapped holes in the work holder. These lugs fit accurately in accurately machined and ground guideways in the work holder and bracket. The arm 182 has a rib 182ᵃ on its lower surface fitting accurately into a groove in the top of the bracket and is retained in adjusted position by bolts or capscrews 183. This permits use of the device on a larger class of work particularly one having elements extending beyond the periphery of the disk.

Thus it will be seen that a very simple and efficient work holder is provided for the purpose outlined and one which can be economically manufactured.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. A work holder comprising a rigid frame having a top and base in spaced parallel planes, a disk resting on the top and having a shaft journalled in the top, the disk having a bearing on the top only near the periphery of the disk and being graduated on its periphery with respect to a line on top, a plurality of means uniformly spaced about the periphery of the top for securing the disk in any adjusted position on the frame at points above said bearing, and means for securing a work piece on the disk.

2. A work holder comprising a rigid frame having a top and base in spaced parallel planes, a disk resting on the top and having a shaft journalled in the top, the disk being graduated on its periphery with respect to a line on top, means on the top for securing the disk in any adjusted position on the frame, a pin having its axis coincident with the axis of the disk, a bushing on the pin adapted to fit into a central hole in a work piece so as to locate the latter axially on the disk, the pin being cut away at the upper end on a longitudinal axis to accommodate a straight edge, and means for securing a work piece on the disk.

3. A work holder comprising a rigid frame having a top and base in spaced parallel planes, a disk resting on the top and having a shaft journalled in the top, the disk being graduated on its periphery with respect to a line on top, means on the top for securing the disk in any adjusted position on the frame, and means for securing a work piece on the disk, said frame having a side at right angles to the top and having a series of holes along each side adapted to receive dowel pins, the holes in the two series having the same spacing so that a bar laid across corresponding dowel pins of the two series will assume a series of parallel positions along said side.

4. A work holder having a rigid frame comprising a top and side at right angles to each other, spaced legs having finished surfaces opposite the top and side so as to stand on said surfaces to bring the top or side uppermost and parallel to the surface of a table on which the holder rests, a disk resting on the top and having a shaft journalled in the top, the disk being graduated on its periphery with respect to a line on top, means on the top for securing the disk in any adjusted position on the frame, means for securing a work piece on the disk, and clamping means operable on the legs for securing the work holder on said table.

5. A work holder comprising a rigid frame having a top and base in spaced parallel planes, a disk resting on the top and having a shaft journalled in the top, the disk being graduated on its periphery with respect to a line on top, a ledge on the rim of the disk, clamps on the top bearing on said ledge for securing the disk in any adjusted position, a pin having its axis coincident with the axis of the disk, a bushing on the pin adapted to fit into a central hole in a work piece so as to locate the latter axially on the disk, the pin being cut away at the upper end on a longitudinal axis to accommodate a straight edge, the tops of the clamps lying below the level of the top of the disk.

6. A work holder comprising a rigid frame having a top and base in spaced parallel planes, a disk resting along an annular ring on its periphery on the top and having a shaft journalled in the top, the disk being graduated on its periphery with respect to a line on top, means on the top for clamping the disk above said annular ring in any adjusted position on the frame, means for securing a work piece on the disk, and a hard replaceable sheet between the disk and top to protect the top and within said annular ring.

7. A work holder comprising a rigid frame having a top and base in spaced parallel planes, a side at right angles thereto, means for securing the work holder to a flat table while resting on either its base or side, a disk bearing on an annular ring on its periphery on the top and having a shaft journalled in the top, the disk being graduated on its periphery with respect to a line on top, means bearing on the disk above the annular ring pressing it on the top for securing the disk in any adjusted position on the frame, and means for securing a work piece on the disk.

8. A work holder comprising a rigid frame, a disk rotatably mounted on the frame and having a bearing thereon only near its periphery, means for clamping the disk near its periphery in any adjusted position on the frame, means for securing a work piece in the frame at said disk, a series of spaced holes in the frame at each side of the disk, dowels adapted to fit tightly into a hole of each series, and a bar adapted to lie across said dowels to position the bar with respect to said work piece.

9. A work holder comprising a rigid frame having a top and base in spaced parallel planes, a disk resting on the top and having a shaft journalled in the top, the disk being graduated on its periphery with respect to a line on top, means on the top for securing the disk in any adjusted position on the frame, and means for securing a work piece on the disk, the top having a series of holes along each side adapted to receive dowel pins, the holes of the two series having the same spacing so that a bar laid across corresponding dowel pins of the two series will assume a series of parallel positions above the disk and work piece.

10. A work holder comprising a rigid frame having a top and base in spaced parallel planes, a disk resting on the top and having a shaft journalled in the top, the disk being graduated on its periphery with respect to a line on top, means on the top for securing the disk in any adjusted position on the frame, and means for securing a work piece on the disk, the top having a series of holes along each side adapted to receive dowel pins, the holes of the two series having the same spacing so that a bar laid across corresponding dowel pins of the two series will assume a series of parallel positions above the disk and work piece, two of said corresponding holes being so placed that a side of the bar will pass through the center of the disk.

GILBERT C. BECKER.